US009935806B2

(12) United States Patent
Oksman et al.

(10) Patent No.: US 9,935,806 B2
(45) Date of Patent: Apr. 3, 2018

(54) ROBUST PREAMBLE FOR COMMUNICATION OVER NOISY MEDIA

(71) Applicant: LANTIQ DEUTSCHLAND GMBH, Neubiberg (DE)

(72) Inventors: Vladimir Oksman, Morganville, NJ (US); Joon Bae Kim, Lexington, MA (US)

(73) Assignee: Lantiq Deutschland GmbH, Neubiberg (DE)

( * ) Notice: Subject to any disclaimer, the term of this patent is extended or adjusted under 35 U.S.C. 154(b) by 0 days.

(21) Appl. No.: 13/779,503

(22) Filed: Feb. 27, 2013

(65) Prior Publication Data

US 2014/0071997 A1    Mar. 13, 2014

Related U.S. Application Data

(63) Continuation of application No. PCT/EP2011/004262, filed on Aug. 25, 2011.

(60) Provisional application No. 61/377,911, filed on Aug. 27, 2010, provisional application No. 61/439,289, filed on Feb. 3, 2011.

(51) Int. Cl.
| | |
|---|---|
| *H04J 3/00* | (2006.01) |
| *H04J 3/16* | (2006.01) |
| *H04L 27/26* | (2006.01) |
| *H04L 29/06* | (2006.01) |

(52) U.S. Cl.
CPC ...... *H04L 27/2613* (2013.01); *H04L 27/2656* (2013.01); *H04L 27/2657* (2013.01); *H04L 27/2692* (2013.01); *H04L 69/22* (2013.01)

(58) Field of Classification Search
USPC .................................................. 370/509–511
See application file for complete search history.

(56) References Cited

U.S. PATENT DOCUMENTS 7,545,827 B2 *  6/2009  Tao et al. ...................... 370/447
7,626,921 B2 * 12/2009  Egashira et al. .............. 370/208
(Continued)

FOREIGN PATENT DOCUMENTS

| WO | WO/2006/000091 A1 | 1/2006 |
| WO | WO 2008/068669 A1 * | 6/2008 |

OTHER PUBLICATIONS

International Search Report for PCT/EP2011/004262.
Office Action dated Feb. 3, 2015 for parallel CN 201180041586.0.

*Primary Examiner* — Gerald Smarth
(74) *Attorney, Agent, or Firm* — Eschweiler & Potashnik, LLC

(57) ABSTRACT

Described herein are techniques related to data communications using a data packet having at least one frame with a robust preamble for use over media having a high degree of non-stationary noise (e.g., impulsive noise). The described techniques employ a preamble with a structure having multiple transitions between the preamble sections. Each transition indicates the start of the upcoming frame. With the techniques described herein, if noise damages the transitions between such sections beyond recognition, the receiver can still determine the frame start time from the one or more of the undamaged transitions. Thus, the robustness of communications via the noisy media is significantly increased. This Abstract is submitted with the understanding that it will not be used to interpret or limit the scope or meaning of the claims.

27 Claims, 9 Drawing Sheets

(56) References Cited

U.S. PATENT DOCUMENTS

| | | | |
|---|---|---|---|
| 8,014,268 B2* | 9/2011 | Fechtel | 370/208 |
| 8,189,697 B2* | 5/2012 | Moffatt et al. | 375/260 |
| 2005/0003769 A1* | 1/2005 | Foerster et al. | 455/113 |
| 2008/0175330 A1* | 7/2008 | Jeon | H04L 27/2647 |
| | | | 375/260 |
| 2009/0303869 A1* | 12/2009 | Umari et al. | 370/210 |
| 2010/0080311 A1 | 4/2010 | Moffatt et al. | |
| 2010/0246719 A1* | 9/2010 | Ko | H04L 5/0053 |
| | | | 375/303 |
| 2010/0266064 A1* | 10/2010 | Hansen | H04L 1/0001 |
| | | | 375/267 |
| 2011/0069657 A1* | 3/2011 | Gholmieh et al. | 370/328 |
| 2013/0089054 A1 | 4/2013 | Hansen et al. | |

* cited by examiner

ROBUST PREAMBLE FOR COMMUNICATION OVER NOISY MEDIA

RELATED APPLICATION

This application claims priority benefit and is a continuation of International Application PCT/EP2011/004262, which was filed on Aug. 25, 2011. The International Application claimed priority benefit of Provisional Applications 61/377,911 and 61/439,289 filed Aug. 27, 2010 and Feb. 3, 2011, respectively. The entire contents of the International Application Provisional Applications are hereby incorporated herein by reference.

BACKGROUND

Data packet transmission in multipoint-to-multipoint networks (e.g., ad-hoc or mesh networks) is usually arranged by sending one or more data packets. A data packet is often encoded and modulated. Also, a data packet typically includes at least one frame. Each frame is preceded by a preamble. The primary purposes of the preamble include 1) enabling the receiver of the frame to detect the frame on the transmission medium, 2) adjusting the gain of the receiver (e.g., an analog front end (AFE)) and synchronizing the clock so that frame is received when expected. The frame also has a header that carries information helping the receiver to address, demodulate, and decode the frame.

Because of their ubiquitous nature, powerlines are increasing in popularity as a transmission medium for many networks. Unfortunately, powerlines are a notoriously noisy medium for data communications. Noise disturbs all parts of the data packet, including the preamble. If the noise erases or significantly damages the preamble or its parts, the entire data packet is usually lost. It is common for impulse noise, both instantaneous and repetitive, to damage the preamble enough to lose the packet. With regard to packet loss, repetitive impulse noise is the most insidious, because retransmission of the packet may not be sufficient to recover from the packet loss.

The conventional approaches to improve robustness of the preamble are typically effective for stationary noise (e.g., white Gaussian noise, WGN). The signals used in the preamble are selected to have high autocorrelation characteristics; thus, they could be recognized in the presence of a high amount of stationary noise.

So, conventional approaches to improve robustness of the preamble are ineffective for noisy communication media, like powerlines, that are characterized by non-stationary noise (e.g., impulse noise) rather than stationary noise.

SUMMARY

Described herein are techniques related to data communications using a data packet having at least one frame with a preamble for use over media having a high degree of non-stationary noise (e.g., impulsive noise). The described techniques employ a preamble with a structure having multiple transitions between the preamble sections. Each transition indicates the start of the upcoming frame. With the techniques described herein, if noise damages the transitions between such sections beyond recognition, the receiver can still determine the frame start time from the one or more of the undamaged transitions. Thus, the preamble is more robust, for example, against non-stationary noise. In the present patent specification, the preamble is therefore sometimes also called "robust" preamble. The robustness of communications via the noisy media is significantly increased.

In one implementation, a multicarrier communications apparatus may include, a preamble construction unit configured to construct a robust preamble of a frame in accordance, at least in part, with preamble parameters. The robust preamble may be constructed to include at least two transitions between a plurality of sequential preamble sections of one or more symbols, wherein each preamble section is bound by preamble symbols that differ from preamble symbols of its one or more neighboring sequential sections. The implementation may also include a multicarrier transmission unit configured to transmit the frame over a communications medium with the robust preamble prepended thereto.

In another implementation, a process may obtain robust-preamble parameters, and construct a robust preamble in accordance, at least in part, with preamble parameters, wherein the robust preamble is constructed to include at least two transitions between a plurality of sequential preamble sections of one or more symbols, wherein each preamble section is bound by preamble symbols that differ from preamble symbols of a preceding section. Furthermore, the implementation may obtain a frame that is yet to be transmitted, and transmit the constructed robust preamble prepended to the frame.

In yet another implementation, there is included computer-readable media storing processor-executable instructions that, when executed, cause one or more processors to perform operations that facilitate successful reception of a data packet via noisy communications media, the operations may include receiving a preamble of a data packet, wherein the preamble, when transmitted, is constructed to include multiple transitions between each section of a plurality of sequential preamble sections of one or more symbols, wherein each preamble section is bound by preamble symbols that differ from preamble symbols of a preceding section, and locating at least one of the multiple transitions between sequential sections. Further operations may include synchronizing a start of a frame of the data packet of the preamble based, at least in part, upon which of the multiple transitions was located, and receiving the frame based upon the synchronizing of the start of the frame.

This Summary is submitted with the understanding that it will not be used to interpret or limit the scope or meaning of the claims. This Summary is not intended to identify key features or essential features of the claimed subject matter, nor is it intended to be used as an aid in determining the scope of the claimed subject matter.

The Detailed Description references the accompanying figures. In the figures, the left-most digit(s) of a reference number identifies the figure in which the reference number first appears. The same numbers are used throughout the drawings to reference like features and components. Also, note that any text smaller than ten point is presented merely to indict where text would appear in the depicted figures. Since such text is merely an indicator of where text might appear, the content of such text is unimportant to the understanding the implementations depicted.

DETAILED DESCRIPTION

Described herein are techniques related to a communications using data packets having frames with robust preambles for communication over noisy media. In particular, the robust preamble is designed for use over a media with high non-stationary noise (e.g., impulsive noise). The described techniques employ a robust preamble with a structure that allows operation in the presence of powerful impulse noise that would otherwise damage the preamble enough to make its data packet unusable.

With one or more implementations of the techniques described herein, the preamble has a plurality of sections that are constructed in the way that sections and the transitions between the sections communicate the knowledge about the reference time when the frame will start. With these implementations, if noise damages one of the sections and/or a transition between such sections beyond recognition, the receiver can still determine the frame start time from the one or more undamaged sections and/or transitions. Thus, the robustness of communications via the noisy media is significantly increased.

Exemplary Implementation and Operation

An Orthogonal Frequency-Division Multiplexing (OFDM) is often used as a digital multi-carrier modulation approach for various communications media. OFDM-based networking/transmission systems utilize multiple subcarriers to transport information from one particular node to another. OFDM is sometimes referred to as multi-carrier or discrete multi-tone modulation. An OFDM-based system divides a high-speed serial information signal into multiple lower-speed sub-signals that the system transmits simultaneously at different frequencies in parallel.

The approach is orthogonal because of the spacing which prevents the demodulators from seeing frequencies other than their own. The benefits of OFDM are high spectral efficiency, resiliency to RF interference, and lower multipath distortion. This is useful because in a typical terrestrial broadcasting scenario there are multipath-channels (i.e., the transmitted signal arrives at the receiver using various paths of different length). Since multiple versions of the signal interfere with each other (intersymbol interference (ISI)), it becomes very hard to extract the original information.

Figure 1:
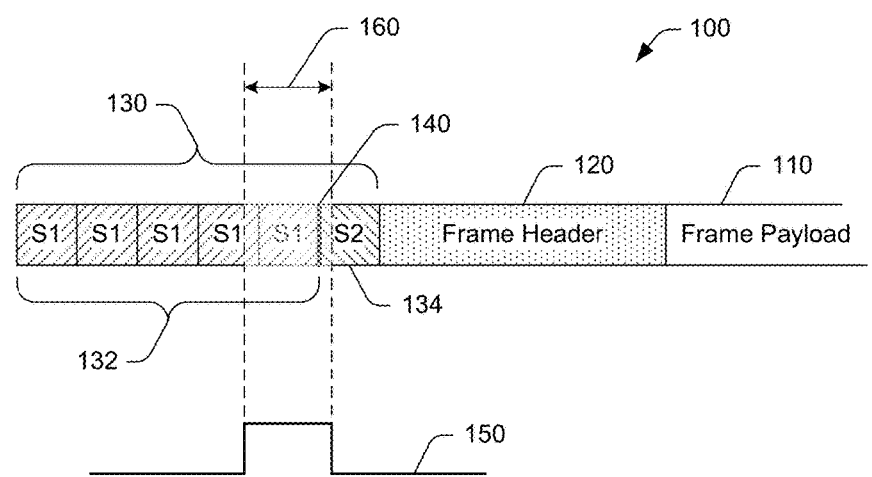
FIG. 1 illustrates a relevant portion of a typical data packet (including a preamble) used in multicarrier communications system, such as an Orthogonal Frequency-Division Multiplexing (OFDM) based system.

FIG. 1 illustrates a relevant portion of a typical data packet 100 used in an OFDM-based system. The data packet 100 includes a frame that includes its payload 110 with a header 120. A preamble 130 is prepended to the frame. The preamble 130 contains several consequent repeating symbols (represented by multiple S1s at 132) ended by a different symbol (represented by S2 at 134). The S2 symbol 134 is typically the inverse of the S1 symbols. On all sub-carriers, the S2 symbol has a flipped phase of the S1 symbol. The flipped symbol 134 indicates the reference point for the start of the frame (i.e., the first symbol of the frame header 120).

Unfortunately, if noise erases the time period during which a symbol flip 140 is transmitted, the start of the frame cannot be detected and the transmitted packet is usually lost. The symbol flip 140 is the point the preamble 130 transitions from multiple S1s symbols 132 to the single flipped S2 symbol 134. If a burst of impulse noise 150 occurs during the symbol flip 140, the burst may damage and/or erase enough of the preamble 130 so that the receiver never recognizes the transition from the last S1 symbol of 132 to the sole S2 symbol 134. Consequently, the receiver cannot locate the start of the frame (e.g., the first symbol of the frame header 120) and the data packet is lost.

Unlike the conventional approaches used with OFDM-based approaches, one or more implementations of the techniques described herein modify the preamble of the OFDM-based approach so that the new preamble includes multiple (e.g., two or more) transitions. That is, the new preamble is constructed so that there is more than one indicator (e.g., transition) of the upcoming start of the frame. Consequently, if an impulse noise destroys one transition, the other one or more transitions are sufficient to indicate the upcoming frame start.

Figure 2:
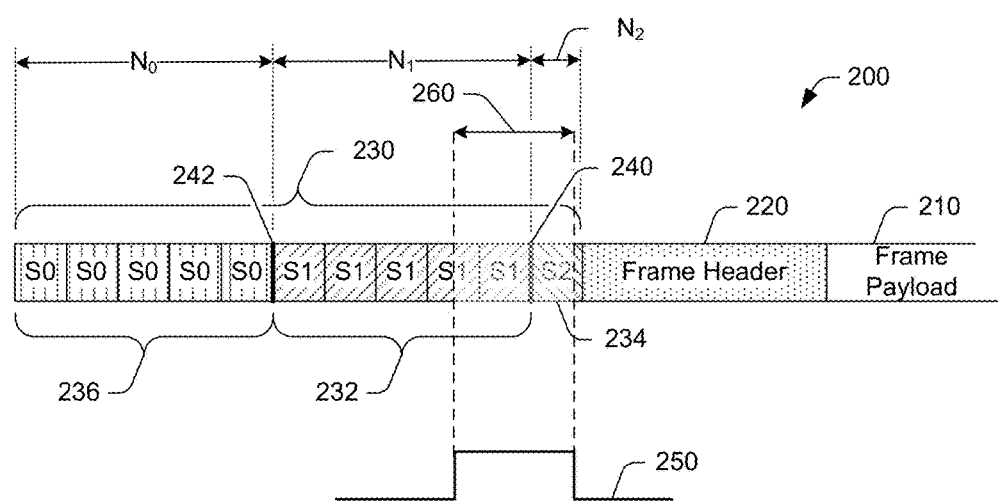
FIG. 2 illustrates a data packet constructed in accordance with techniques described herein and that may be implemented in a multicarrier approach, such as an OFDM-based system.

FIG. 2 illustrates a data packet 200 constructed in accordance with the techniques described herein and that may be implemented in a multicarrier approach, such as an OFDM-based system. The data packet 200 includes a frame with its payload 210 with a header 220. A preamble 230 is prepended to the frame. The preamble 230 contains a sequence of at least three consecutive sections: 236, 232, and 234, in that order from left to right. The symbols of each section differ from the symbols of the other. Each of the first two sections has its own set of repeating or duplicate preamble symbols. The symbols of the first section 236 are represented as S0 and differ from the symbols of the second section 232, which are represented as S1. Following the second section 232 is an ending section 234 of at least one symbol (represented by S2) that differs from the symbols of the second section.

The first section 236 has a defined number, $N_0$, of multicarrier (e.g., OFDM) symbols. Likewise, the second section 232 and the ending section 234 have a defined number of multicarrier symbols, which are $N_1$ and $N_2$, respectively. For the example depicted in FIG. 2, $N_0=5$, $N_1=5$, and $N_2=1$. Of course, the values of N for each section of a plurality of sections may vary depending upon the implementation.

Based upon knowledge of the values of N for each section of the pluralities of sections of the preamble, the receiver can determine the start of the frame (i.e., the first symbol of the frame header 220) upon detecting (i.e., locating or identifying) a transition between one section and the next. For example, transition 242 between section 236 and section 232 indicates that the frame will start after counting $N_1+N_2$ multicarrier symbols, which equals six symbols as shown in FIG. 2. Also, for example, transition 240 between section 232 and section 234 indicates that the frame will start after counting $N_2$ multicarrier symbols, which is one symbol as shown in FIG. 2. Thus, in one embodiment, the preamble, being constructed to include at least two transitions between a plurality of sequential preamble sections of one or more symbols, may be constructed with two transitions, where a first of the two transitions follows a first preamble section and a second of the two transitions follows a second preamble section that is subsequent to the first preamble section.

If, for example, noise damages the signal during the time period within which a transition 240 is transmitted, that transition is ineffective as an indicator of the start of the frame. However, unlike the conventional approach, the loss of one transition does not mean the loss of the entire frame. Rather, the start of the frame can be anticipated based upon a successful reception of another transition. In this example, the reception of transition 242 enables the location of the start of the frame (i.e., the first symbol of the frame header 220).

Further, to enhance the distinction between the transitions, at least one additional S2 symbol may be added after the second transition 240. That is, an additional S2 symbol may be added to part of the third section 234 of the preamble (as shown in FIG. 2). Thus, the second transition 240 would have a pattern S1-S2-S2, for example. The same principle may apply to the first transition 242. This may help in detecting a transition where the larger window size is used. Another way to help identify the second transition 240 is to use different numbers of multicarrier symbols used in the first and second sections of preambles.

Powerful repetitive impulse noise is common in powerlines. If the frequency of such respective impulse noise is known or can be anticipated, then the preamble parameters (such as number of transitions, number of symbol sections, and associated value of N each section) may be set so that at least one transition is likely to avoid damage by the periodic repetitive impulse noise.

Figure 3:
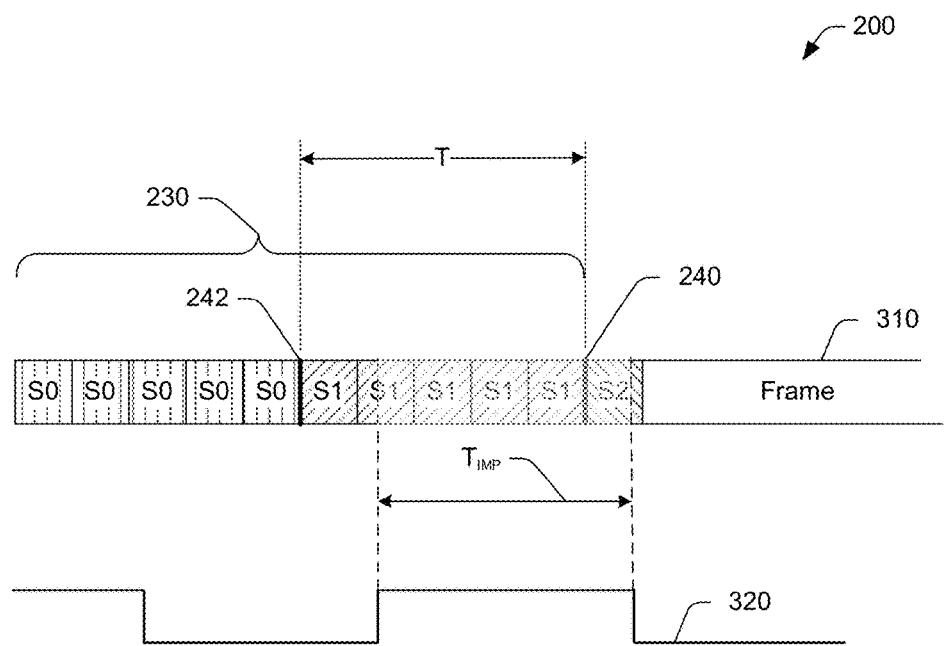
FIG. 3 shows a data packet with a frame that includes its payload and header.

FIG. 3 shows the data packet 200 with a frame 310 that includes its payload and header (which are not shown in FIG. 3). The preamble 230 has two transitions 242 and 240. A time interval, T, between the first transition 242 and the second transition 240 is greater than the duration of a periodic repetitive impulse noise, $T_{IMP}$. With this arrangement, the preamble 230 is fully protected against the repetitive impulse noise.

While only two transitions and three sections of symbols are shown in FIGS. 2 and 3 and described herein, other implementations may use more than just two transitions and more than just three sections of symbols. Also, other implementations may use different N values of the section than what is depicted and described here. Of course, additional transitions and sections increase the degree of protection provided against data packet loss on a noisy communication medium.

The techniques described herein are backwards compatible. For example, if a receiver is a legacy device that is only capable to use the conventional single-transition preamble (as depicted in FIG. 1), the legacy device may continue operating with the new multi-transition preamble.

Various implementations of signals of the multicarrier preamble symbols (e.g., S0, S1, and S2) are possible, including (but not limited to) a chirp signal, a multicarrier (e.g., ODFM) symbol modulated by a pseudorandom binary sequence (PRBS), and/or a symbol using a modulation sequence with high or non-zero autocorrelation properties. In one or more implementations, signals of the multicarrier preamble symbols are implemented by same modulation function used on different tones of the multicarrier (e.g., ODFM) symbol.

For instance, the following is one implementation of the multicarrier preamble symbols (e.g., S0, S1, and S2):

S0 is a implemented by modulation of only even tones;
S1 uses modulation that is inverted relatively to S0 on even tones and same modulation as S0 on odd tones; and
S2 uses modulation that is opposite to S1 on all tones.

Figure 4:
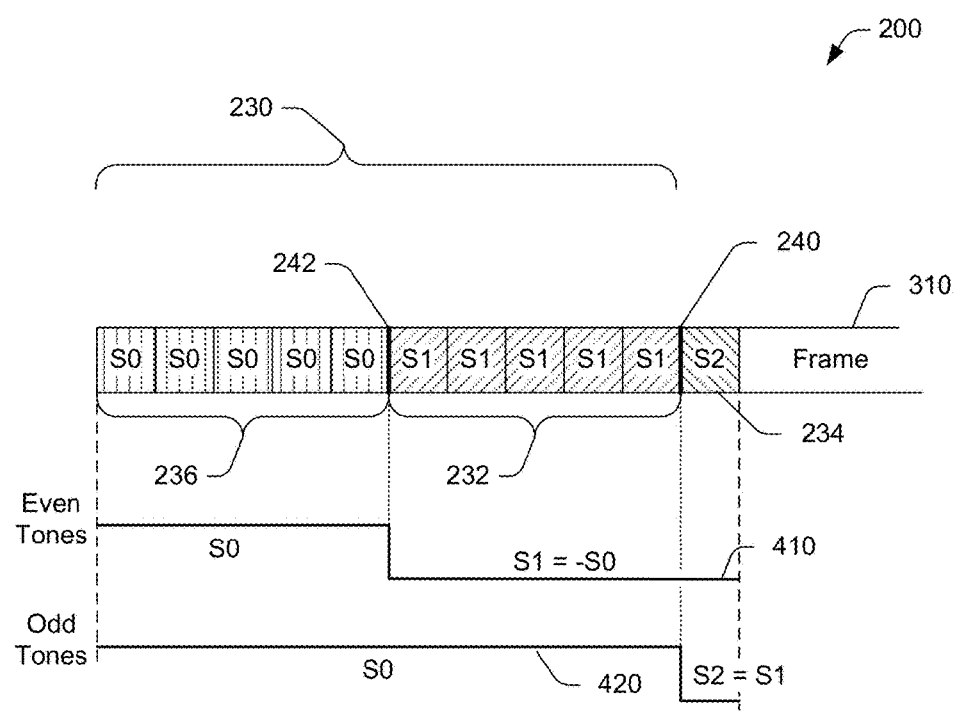
FIG. 4 depicts the data packet of another implementation, in accordance with techniques described herein and that may be implemented in a multicarrier approach, such as an OFDM-based system.

FIG. 4 depicts the data packet 200 of another implementation. The modulation of the even tones 410 and the odd tones 420 are shown in FIG. 4. In this implementation, the S0 modulates all tones (e.g., 410 and 420) of the first section 236. The S1=−S and modulates all even tones of the second and third sections, 232 and 234 respectively. The S0 modulates all odd tones of the second section 232. The S2=S1 and modulates all tones of the third section 234.

In still another implementation, the same type of signal may be used for different parts of the preamble. For example, the signals of the multicarrier preamble symbols (e.g., S0, S1, and S2) are set to the following values:

S0 for all tones of the first section 236;
S1=−S0 for all tones of the second section 232; and
S2=S0 for all tones of the third section 234.

With this arrangement, both transitions can be detected, but it may be difficult to distinguish between the first transition 242 and the second one 240. To mitigate this uncertainty, the "trial-and-error" method may be employed. That is, the receiver starts to detect the frame based on the first detected transition. Further, it drops if the frame is not detected and tries the second transition. In other implementations, some tones of the preamble do not carry any transitions to improve channel estimation (pilot tones).

In still another implementation, the signals of the multicarrier preamble symbols (e.g., S0, S1, and S2) may be handled in this manner:

S0 is generated as inverted S1 (−S1) with all even or all odd tones removed. Hence each enabled subcarrier carries the inverted modulation with respect to the corresponding subcarriers of S1;
All odd and even sub-carriers are modulated by S1; and
All odd and even sub-carriers are modulated by an inverted S1 (S2=−S1).

Figure 5:
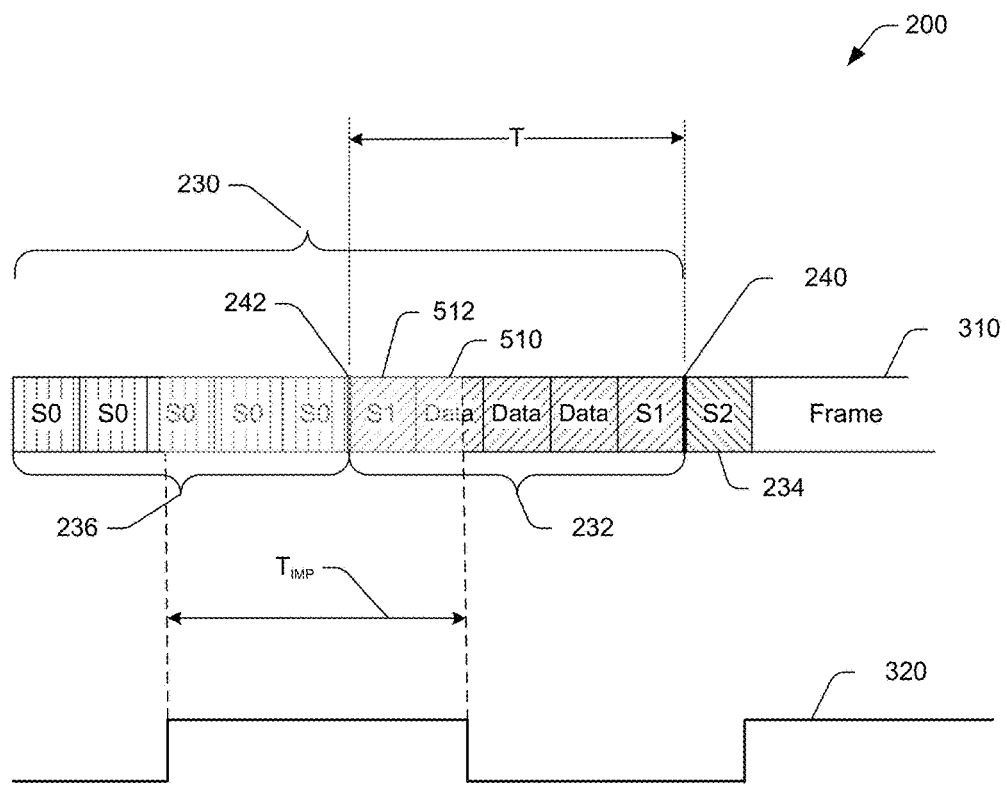
FIG. 5 shows a data packet with a frame, in accordance with a particular implementation.

FIG. 5 shows the data packet 200 with the frame 310. The preamble 230 has two transitions 242 and 240. T is the time interval between the first transition 242 and the second transition 240. $T_{IMP}$ is the duration of the periodic repetitive impulse noise.

In this implementation, the symbols of the second section 232 differ from one another. Some of the symbols are preamble symbols S1 and other symbols are non-preamble symbols, in particular, these symbols are labeled "Data." In this instance, at least one symbol at the edges of each transition is one that the receiver recognizes as part of the preamble. That is, the symbols at the boundary of each section are the preamble symbols (e.g., S1) for that section. For example, as shown in FIG. 5, the second section 232 has preamble symbol S1 right after the first transition 242 and right before the second transition 240. The symbols in the middle could be other types of symbols other than a preamble symbol. They could be, for example, data symbols of the frame header or of the frame.

As shown in FIG. 5, the first data symbol may start from the position that would have been occupied by the second S1 symbol after the first transition 242 or later, and end at any position before the last symbol S1 followed by the second transition 240. The number of these data symbols and their position shall be known to the receiver, thus the receiver can recover these data symbols when it misses the first transition, but detects the second one.

In other implementations, S2 may be equal to −S1, and also S0 may be equal to −S1 (or equivalently S1=−S0 and S2=S0). With this, the detector could be implemented to operate so that if the receiver once detects S0=−S1, it shall look for a transition S0→S1. If it misses this transition due to impulse noise, the receiver will again find S1 of the second transition and then will look for the symbol that follows S1. If this symbol is S0=−S1, the receiver is confident that this is the second transition, since after the S1 of the first transition, the next symbol is data or another S1 signal.

In some other implementations, the data symbols and preamble symbols use the same or similar modulation technique. An example of such a modulation technique is multicarrier symbols loaded with a pseudorandom binary sequence (PRBS). To enhance the difference between the first and the second transitions (242, 240), at least the first data symbol uses randomization (i.e., scrambling) with a different seed (i.e., initialization sequence) or different polynomial than used for PRBS generator of the preamble symbols S0, S1, and symbol S2. For instance, if the generation polynomial of the preamble is X(m), the randomization polynomial for data symbols could be Y(m), and may use different levels or be selected to be orthogonal. The initialization sequences of both generators can also be selected to provide orthogonal sequences.

Also, as depicted in FIG. 5, if a first data symbol 510 after a S1 symbol 512 after the first transition 242 is very similar to S2 of section 234, the first transition 242 may be confused with the second one 240. To avoid that confusion, a transmitter can check the symbol 510 prior to transmission, and if discovered to be similar to the S1 symbol 512, the transmission parameters of data symbols can be changed or some bits of this first symbol 510 can be modified. This may introduce errors into the data communicated by this symbol, although these errors may be easily picked by forward error correction at the receiver.

Further, a second S2 symbol (of the section 234 but not depicted) can have several pre-defined sub-carriers that are modulated differently than in the first S2 symbol of the section 234. Alternatively, the second S2 symbol may be left un-transmitted.

In another implementation, only one symbol is used to mark the second transition. This symbol shall use modulation or encoding that is very different (e.g., orthogonal) relative to S1, S2, and also to all data symbols. The following are examples of such an approach:

Use a pre-defined modulation pattern that brings strong correlation between constellation points of each sub-carrier. In one implementation, all even sub-carriers are modulated with the same constellation point and all odd sub-carriers with another constellation point; in addition, to minimize errors, these constellation points are taken at maximum distance from each other and at maximum distance from constellation points used for S1 and S2.

If two symbols identify a second transition, the second one, in one implementation, has every even sub-carrier of the S2 uses a constellation point of the odd sub-carriers in the S1, and every odd sub-carrier of the S2 using constellation that is used by even sub-carriers of the S1. Of course, other combinations are also possible.

As described herein, the terms "all subcarriers/tones", "all even subcarriers/tones", or "all odd subcarriers/tones" relate to "all relevant" subcarriers. That is, they are related to those subcarriers allowed for transmission over the medium with the selected bandplan and related regulation and implementation constraints.

Exemplary Network Communications Arrangement

An exemplary communication arrangement may employ at least two multicarrier apparatuses or nodes. The exemplary communication arrangement may also employ a multicarrier controller apparatus or controller node. In one implementation, the multicarrier apparatuses/controller is Orthogonal Frequency Division Multiplexing (OFDM) apparatuses capable of implementing the herein described techniques. In another implementation, the exemplary communication arrangement employs apparatuses or nodes that communicate via a wired/wireless medium by way of one or more communication protocols.

The multicarrier apparatuses may communicate through a communication channel and especially a noisy communications channel. The communication channel may be realized as one or more wireless communication media, one or more wireline communication media (e.g., coaxial cable, twisted pair of copper wires, powerline wiring, Ethernet cabling, optical fiber, etc.), or combinations thereof. Accordingly, the multicarrier apparatuses may include structure and functionality that enable signal communication over such media. Such structure and functionality may include one or more antennas, integrated wireline interfaces, and the like. Such structure and functionality may employ multiple differing wireline media (e.g., coaxial cable and powerline wiring). Depending on the implementation, the multicarrier apparatuses may communicate with one another directly (peer-to-peer mode) or the multicarrier apparatuses may communicate via the controller apparatus.

A family of networking standards called G.hn has been proposed by the International Telecommunication Union's Standardization arm (ITU-T) and promoted by the HomeGrid Forum. One or more of the G.hn specifications define networking over both wireline (e.g., powerlines, phone lines and coaxial cables) and wireless networks. The G.hn specifications specify standards by which multicarrier apparatuses may communicate via such communications channels. The techniques described herein may be employed with those G.hn specifications or other specifications.

Figure 6:
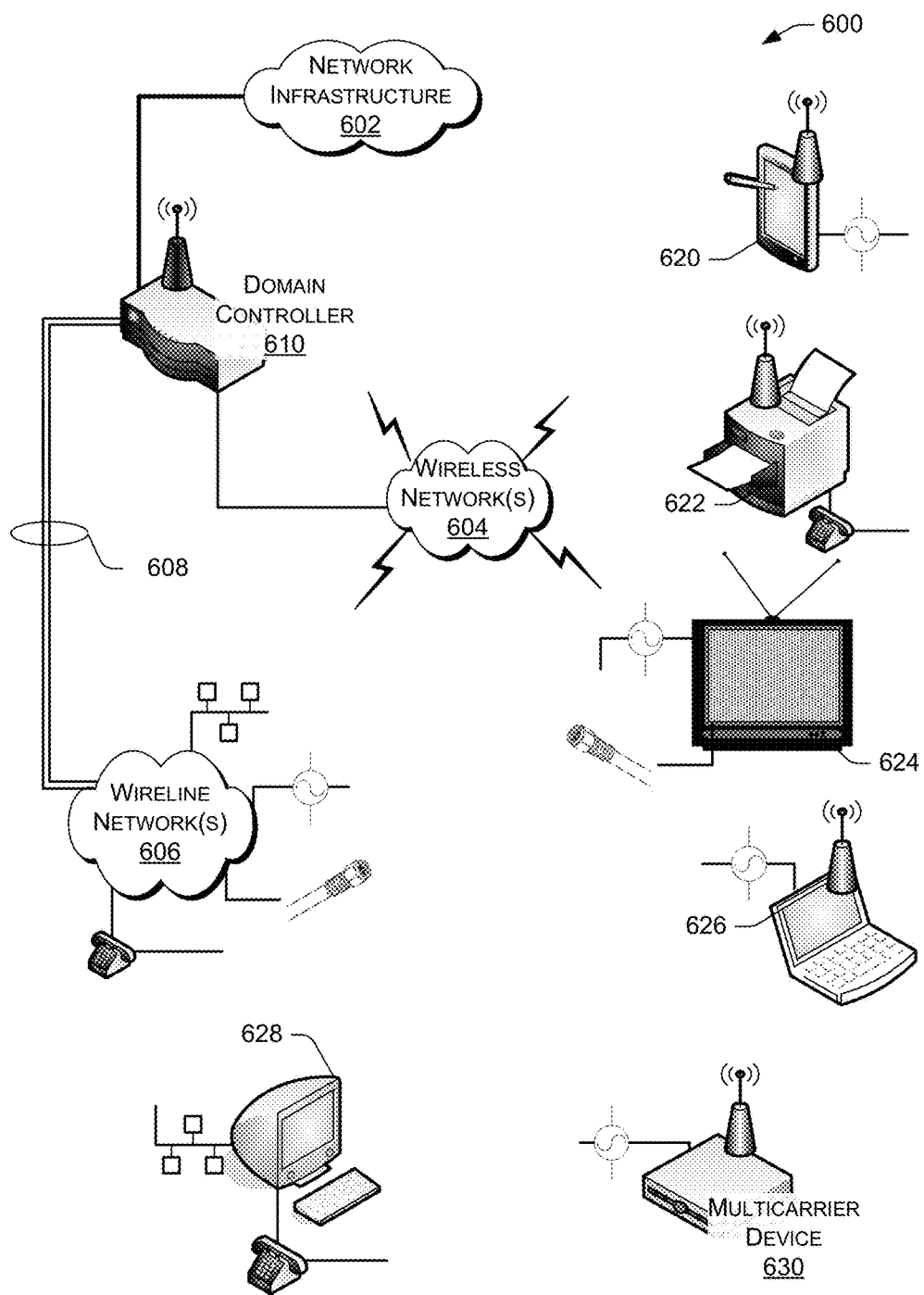
FIG. 6 shows an exemplary networking communications arrangement in which one or more implementations of the techniques described herein may be employed.

FIG. 6 shows an exemplary networking communications arrangement 600 in which one or more implementations may be employed. The multicarrier controller apparatus of the arrangement 600 is an access point 610 of a home networking environment. As shown in FIG. 6, the access point 610 may be a residential gateway that distributes broadband services from a connected network infrastructure 602 (e.g., the Internet) to various multicarrier apparatuses via one or more wireless networks 604 and one or more wireline networks 606. The wireless networks 604 may also be called wireless local area networks (WLAN) and the wireline networks 606 may be called local area networks (LANs).

The various multicarrier apparatuses depicted in FIG. 6 include a tablet computer 620, a network printer 622, a television 624, a laptop computer 626, a desktop computer 628, and a generic multicarrier apparatus or device 630 (e.g., a digital video recorder (DVR) and Internet TV device). The multicarrier apparatuses may be associated with digital content destinations in the home, but may also be associated with digital content sources, such as digital video recorders (DVR), computers providing streaming video, televisions, entertainment centers, and the like.

As depicted, the tablet computer 620 is configured to communicate via both wireless and powerline wireline networks, the network printer 622 is configured to communicate via wireless and/or twisted-pair cabling (e.g., telephone wiring) based wireline networks, the television 624 is configured to communicate via either of two different wireline networks (e.g., coaxial cabling and/or powerline cabling based), the laptop computer 626 communicates via powerline based wireline and/or wireless networks, and the desktop computer 628 is configured to communicate via an Ethernet cabling based wireline network and/or twisted-pair cabling (e.g., telephone wiring) based wireline networks. Similarly, the multicarrier device 630 is configured to communicate via wireless and/or powerline-based wireline networks. As depicted, the wireline networks 606 include one or more wireline networks based upon Ethernet cabling (e.g., Cat-5), powerline wiring, coaxial cabling, and/or telephone cabling. As represented by multiple wire connections 606, the domain controller 610 is connected via multiple different wirings to the multiple different wireline networks 606.

Furthermore, the multicarrier apparatuses may be enabled to communicate using packet-based technology (e.g., ITU G.hn, HomePNA, HomePlug® AV and Multimedia over Coax Alliance (MoCA)) and xDSL technology). Such xDSL technology may include Asymmetric Digital Subscriber Line (ADSL), ADSL2, ADSL2+, Very high speed DSL (VDSL), VDSL2, G.Lite, and High bit-rate Digital Subscriber Line (HDSL). In addition, some multicarrier apparatuses (such as 620, 622, 626, and 630) may be enabled to communicate using IEEE 802.11 and IEEE 802.16 (Wi-MAX) wireless technologies.

Signals exchanged between the multicarrier apparatuses may include multicarrier symbols that each include a plurality of tones or sub-channels. Each of the tones within a multicarrier symbol may have data bits modulated thereon that are intended for delivery from one of the multicarrier apparatuses to another.

Exemplary Network Device Employing Robust Preamble Techniques

Figure 7:
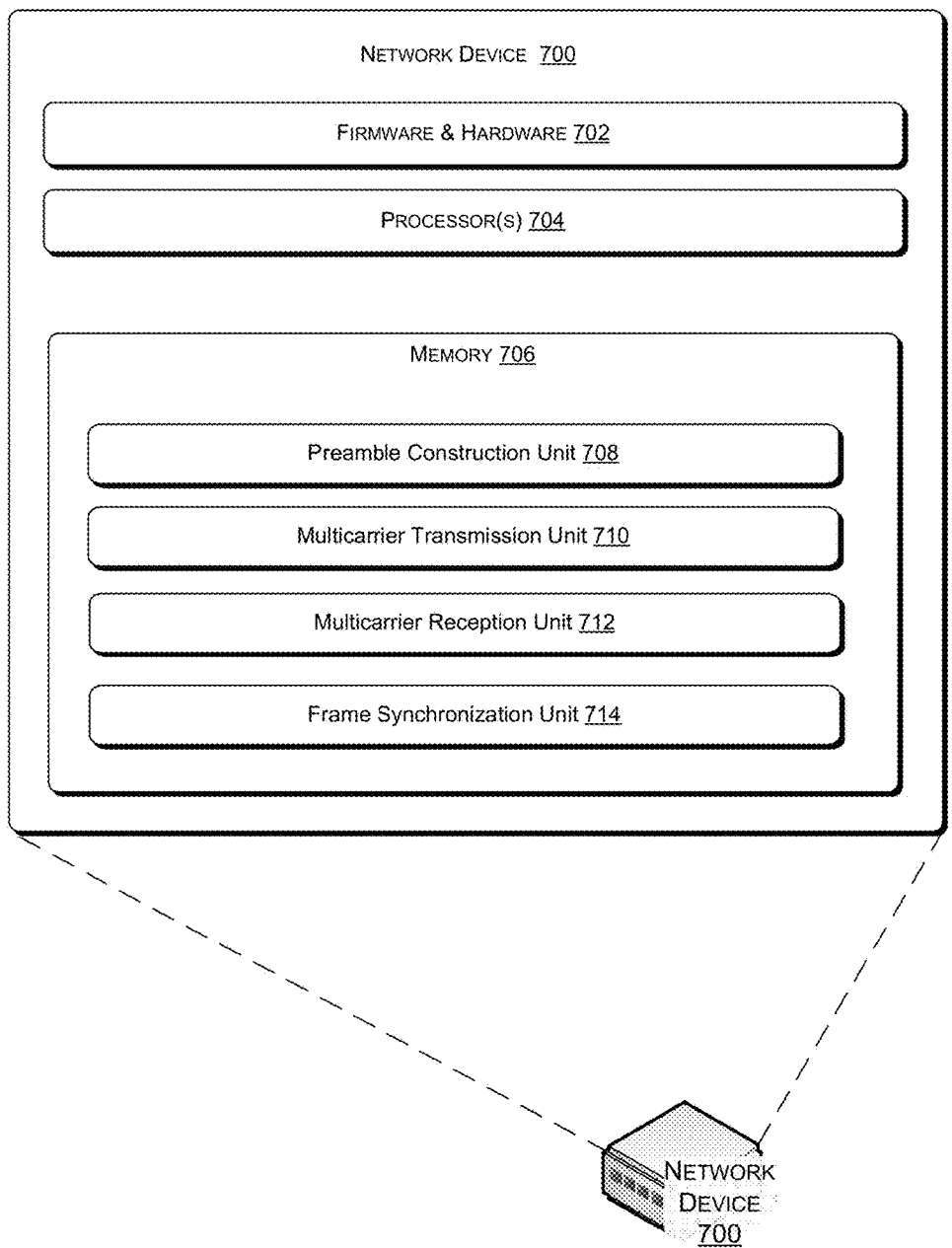
FIG. 7 illustrates an exemplary network device configured to implement the techniques described herein.

FIG. 7 shows an exemplary network device 700 configured to employ the robust preamble techniques described herein. The network device 700 may be, for example, a network controller, a multicarrier controller apparatus (such as the access point 610 in FIG. 6), and/or a multicarrier apparatus (such as 620-630 of FIG. 6).

The network device 700 is depicted, in FIG. 7, in an expanded view to better show some of the relevant components therein. The network device 700 may include firmware & hardware 702, one or more processors 704, and a memory 706. The network device 700 has one or more modules of processor-executable instructions stored in the memory 706. The network device 700 may include a preamble construction unit 708, a multicarrier transmission unit 710, a multicarrier reception unit 712, and a frame synchronization unit 714.

The preamble construction unit 708 constructs a robust preamble of a frame in accordance, at least in part, with preamble parameters, such as a number of the sequential preamble sections in a plurality of such section and a designated number (e.g., $N_0$, $N_1$, and $N_2$) of symbols for each of the sections. When constructed, the robust preamble has at least two transitions between the sections of a plurality of sequential preamble sections of one or more symbols. Each preamble section is bound by preamble symbols that differ from preamble symbols of its one or more neighboring sequential sections. For example, the ending preamble symbol of the first section differs from the beginning preamble symbol of the second section.

The multicarrier transmission unit 710 is configured to transmit the frame over a communications medium with the robust preamble prepended thereto. That communication medium may be a particularly noisy medium, such as a powerline. An OFDM transceiver is an example of a suitable device for the multicarrier transmission unit 710.

The multicarrier reception unit 712, such as the OFDM transceiver, receives a data packet having a frame and robust preamble prepended thereto via a noisy communications medium.

The frame synchronization unit 714 monitors the incoming preamble of a frame of a data packet. Based upon one or more transitions in the preamble, it calculates/predicts when the frame will start. The reception unit 712 can begin receiving the frame at the predicted time.

While the network device 700 is described herein in terms of modules and sub-modules of processor-executable instructions, the functionalities of these modules and sub-modules may be implemented in software, hardware, firmware, or a combination thereof.

Exemplary Processes

Figure 8:
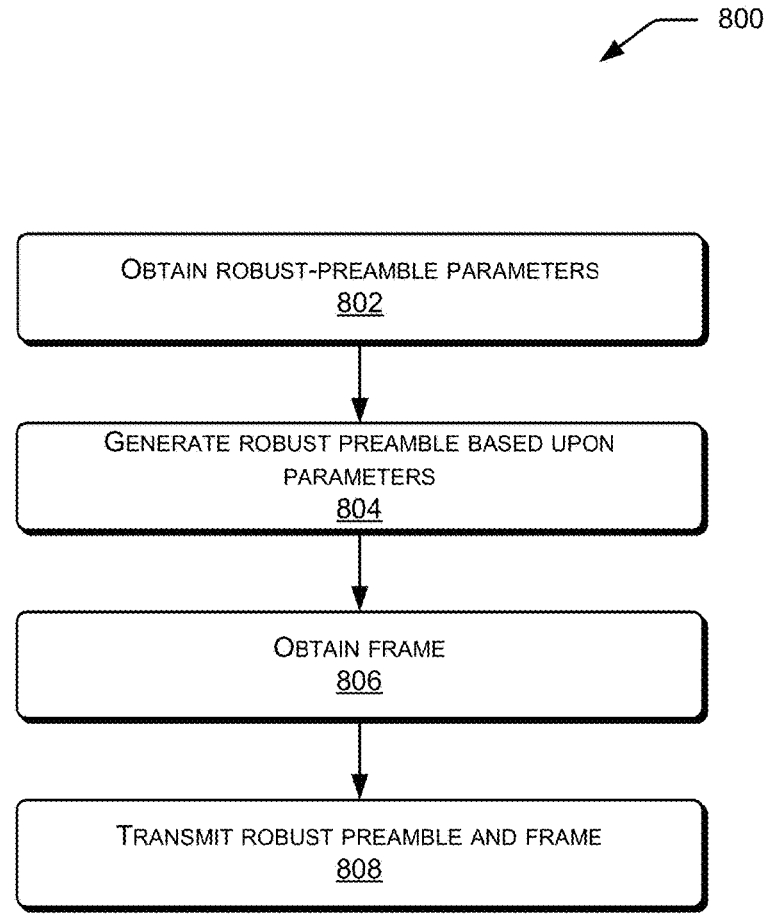
FIGS. 8 and 9 are flowcharts of processes that are configured to implement the techniques described herein.
Figure 9:
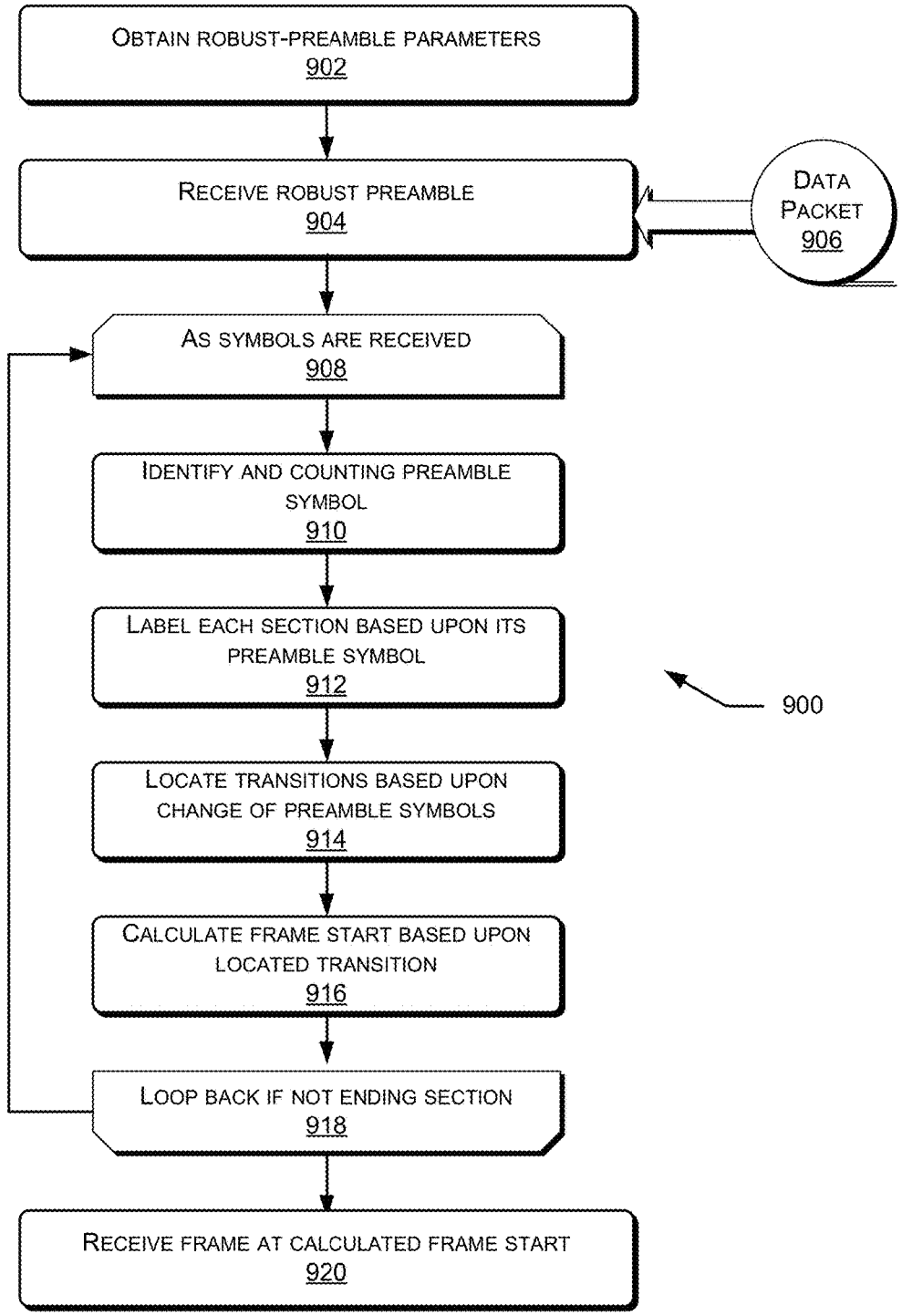

FIGS. 8 and 9 are flowcharts illustrating exemplary processes 800 and 900 that implement the techniques described herein for use of a robust preamble. The exemplary processes 800 and 900 are performed, at least in part, by a networking device such as a multicarrier controller apparatus (e.g., the access point 610 of FIG. 6), a multicarrier apparatus (e.g., the device 630 of FIG. 6), and/or network device 700 of FIG. 7. Many of the operations of the processes 800 and 900 are described with references to the illustration of such operations in previously introduced drawing figures, such as FIGS. 1-7.

FIG. 8 includes process 800, which generates a robust preamble in accordance with the techniques described herein. Typically, this process 800 is performed by a network device performing a multicarrier transmission over a noisy medium.

At 802, the process 800 begins with obtaining robust-preamble parameters, such as a number of the sequential preamble sections in a plurality of such sections and a designated number (e.g., $N_0$, $N_1$, and $N_2$) of symbols for each of the sections. Of course, some or all of these parameters may be fixed and therefore, do not need to be obtained each time the process runs. Alternatively, some or all of these parameters may be variable or configurable by an administrator or user.

At 804, the network device generates a robust preamble based upon those obtained parameters. When generated, the robust preamble has at least two transitions between the sections of the plurality of sequential preamble sections of one or more symbols. Each preamble section is bound by preamble symbols that differ from preamble symbols of a preceding section. For example, the ending preamble symbol of the first section differs from the beginning preamble symbol of the second section.

At 806, the network device obtains a frame that has not yet been transmitted. As part of this operation, the device may obtain and/or generate the frame payload and header.

At 808, the network device transmits the frame with the robust preamble prepended thereto. As part of this operation, the device modulates the robust preamble using one or more of the implementations described herein for modulating the sections of the preamble.

FIG. 9 includes process 900, which synchronizes a frame based upon its robust preamble in accordance with the techniques described herein. Typically, this process 900 is performed by a network device receiving a multicarrier transmission over a noisy medium.

At 902, the process 900 begins with the network device obtaining robust-preamble parameters, such as a number of the sequential preamble sections in a plurality of such section and a designated number (e.g., $N_0$, $N_1$, and $N_2$) of symbols for each of the sections. Of course, some or all of these parameters may be fixed and therefore, do not need to be obtained each time the process runs. Alternatively, some or all of these parameters may be variable or configurable by an administrator or user. The receiver may receive the parameters from the transmitter. Regardless, of the parameters being fixed or variable, it is presumed that the transmitter and receiver of a transmitted data packet use the same parameters.

At 904, the network device receives a robust preamble 906 of a data packet, wherein the preamble is received. When the preamble is transmitted, it was constructed to include multiple transitions between each section of a plurality of sequential preamble sections of one or more symbols, wherein each preamble section is bound by preamble symbols that differ from preamble symbols of a preceding section.

While receiving the robust preamble, the network device locates at least one of the multiple transitions between sequential sections and synchronizes a start of a frame of the data packet of the preamble based, at least in part, upon which of the multiple transitions was located.

In particular, while each symbol of the preamble (at 908) is received, the network device may perform the following:

At 910, identification of preamble symbols (e.g., S0, S1, or S2) and counting the symbols;

At 912, labeling of each section based upon its identified symbol at its boundary;

At 914, detection of a change in subsequent preamble symbols (e.g., S0→S1) and location/identification of least one of the multiple transitions between sections based, at least in part, upon the detected change; in addition, there is a determination of which of the multiple transitions has been located; and At 916, calculation of the start of the frame based, at least in part, upon which of the multiple transitions was located/identified.

The above is performed until the last section (e.g., the one with the S2 symbol) is detected at 918.

With regard to the calculation of operation 916, the network device can determine the start of the frame (e.g., synchronize) by counting number N of the sections between the detected/located transition and the expected frame start. For example, with reference to FIG. 2, the transition 242 between section 236 and section 232 indicates that the frame will start after counting $N_1+N_2$ (e.g., 5+1) multicarrier symbols, which is six symbols as shown in FIG. 2. Also, for example, transition 240 between section 232 and section 234 indicates that the frame will start after counting $N_2$ multicarrier symbols, which is one symbol as shown in FIG. 2.

At 920, the network device receives the frame based upon the synchronized start of the frame determined by the calculation.

Additional and Alternative Implementation Notes

Exemplary implementations discussed herein may have various components collocated; however, it is to be appreciated that the various components of the arrangement may be located at distant portions of a distributed network, such as a communications network and/or the Internet, or within a dedicated secure, unsecured and/or encrypted arrangement. Thus, it should be appreciated that the components of the arrangements may be combined into one or more apparatuses or collocated on a particular node of a distributed network, such as a telecommunications network. Moreover, it should be understood that the components of the described arrangements may be arranged at any location within a distributed network without affecting the operation of the arrangements. Similarly, one or more functional portions of the arrangement may be distributed between a modem and an associated computing device.

The above-described arrangements, apparatuses and methods may be implemented in firmware, hardware, software, one or more software modules, one or more software and/or hardware testing modules, one or more telecommunications test devices, one or more DSL modems, one or more ADSL modems, one or more xDSL modems, one or more VDSL modems, one or more linecards, one or more G.hn transceivers, one or more MOCA transceivers, one or more Homeplug transceivers, one or more powerline modems, one or more wired or wireless modems, test equipment, one or more multicarrier transceivers, one or more wired and/or wireless wide/local area network systems, one or more satellite communication systems, network-based communication systems (such as an IP, Ethernet or ATM system), one or more modems equipped with diagnostic capabilities, or the like, or on one or more separate programmed general purpose computers having a communications device or in conjunction with any of the following communications protocols: CDSL, ADSL2, ADSL2+, VDSL1, VDSL2, HDSL, DSL Lite, IDSL, RADSL, SDSL, UDSL, MOCA, G.hn, Homeplug or the like.

Additionally, the arrangements, procedures and protocols of the described implementations may be implemented on a special purpose computer, a programmed microprocessor or microcontroller and peripheral integrated circuit element(s), an ASIC or other integrated circuit, a digital signal processor, a flashable device, a hard-wired electronic or logic circuit such as discrete element circuit, a programmable logic device such as PLD, PLA, FPGA, PAL, a modem, a transmitter/receiver, any comparable device, or the like. In general, any apparatus capable of implementing a state machine that is in turn capable of implementing the methodology described and illustrated herein may be used to implement the various communication methods, protocols and techniques according to the implementations.

Furthermore, the disclosed procedures may be readily implemented in software using object or object-oriented software development environments that provide a portable source code that can be used on a variety of computer or workstation platforms. Alternatively, the disclosed arrangements may be implemented partially or fully in hardware using standard logic circuits or VLSI design. The communication arrangements, procedures and protocols described and illustrated herein may be readily implemented in hardware and/or software using any known or later developed systems or structures, devices and/or software by those of ordinary skill in the applicable art from the functional description provided herein and with a general basic knowledge of the computer and telecommunications arts.

Moreover, the disclosed procedures may be readily implemented in software that can be stored on a computer-readable storage medium, executed on a programmed general-purpose computer with the cooperation of a controller and memory, a special purpose computer, a microprocessor, or the like. In these instances, the arrangements and procedures of the described implementations may be implemented as a program embedded on a personal computer such as an applet, JAVA® or CGI script, as a resource residing on a server or computer workstation, as a routine embedded in a dedicated communication arrangement or arrangement component, or the like. The arrangements may also be implemented by physically incorporating the arrangements and/or procedures into a software and/or hardware system.

The implementations herein are described in terms of exemplary embodiments. However, it should be appreciated that individual aspects of the implantations may be separately claimed and one or more of the features of the various embodiments may be combined. In the above description of exemplary implementations, for purposes of explanation, specific numbers, materials configurations, and other details are set forth in order to better explain the invention, as claimed. However, it will be apparent to one skilled in the art that the claimed invention may be practiced using different details than the exemplary ones described herein. In other instances, well-known features are omitted or simplified to clarify the description of the exemplary implementations.

The inventors intend the described exemplary implementations to be primarily examples. The inventors do not intend these exemplary implementations to limit the scope of the appended claims. Rather, the inventors have contemplated that the claimed invention might also be embodied and implemented in other ways, in conjunction with other present or future technologies.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts and techniques in a concrete fashion. The term "techniques," for instance, may refer to one or more devices, apparatuses, systems, methods, articles of manufacture, and/or computer-readable instructions as indicated by the context described herein.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

The exemplary processes discussed herein are illustrated as a collection of blocks in a logical flow graph, which represents a sequence of operations that can be implemented with hardware, software, firmware, or some combination thereof. In the context of software/firmware, the blocks represent instructions stored on one or more processor-readable storage media that, when executed by one or more processors, perform the recited operations. The operations of the exemplary processes may be rendered in virtually any programming language or environment including (by way of example and not limitation): C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (BREW), and the like.

Note that the order in which the processes are described is not intended to be construed as a limitation, and any number of the described process blocks can be combined in any order to implement the processes or an alternate process. Additionally, individual blocks may be deleted from the processes without departing from the spirit and scope of the subject matter described herein.

The term "processor-readable media" includes processor-storage media. For example, processor-storage media may include, but are not limited to, magnetic storage devices (e.g., hard disk, floppy disk, and magnetic strips), optical disks (e.g., compact disk (CD) and digital versatile disk (DVD)), smart cards, flash memory devices (e.g., thumb drive, stick, key drive, and SD cards), and volatile and non-volatile memory (e.g., random access memory (RAM), read-only memory (ROM)).

For the purposes of this disclosure and the claims that follow, the terms "coupled" and "connected" may have been used to describe how various elements interface. Such described interfacing of various elements may be either direct or indirect.

What is claimed is:

1. A multicarrier communications apparatus comprising:
a preamble construction unit configured to construct a robust preamble of a frame in accordance, at least in part, with preamble parameters, wherein the robust preamble is constructed to include at least two transitions between a plurality of sequential preamble sections of one or more equal symbols, wherein each preamble section is bound by preamble symbols that differ from preamble symbols of its one or more neighboring sequential sections, wherein a designated number of the equal symbols between adjacent ones of the at least two transitions is larger than four,
a multicarrier transmission unit configured to transmit the frame over a wired communications medium subject to non-stationary noise with the robust preamble associated therewith.

2. The multicarrier communications apparatus as recited in claim 1, wherein the preamble parameters are selected from a group consisting of a number of the sequential preamble sections and the designated number of symbols for each of the sections.

3. The multicarrier communications apparatus as recited in claim 1, wherein the multicarrier transmission unit is further configured to transmit by utilizing Orthogonal Frequency-Division Multiplexing (OFDM).

4. The multicarrier communications apparatus as recited in claim 1, wherein the preamble construction unit is further configured to construct at least one section of the plurality of sequential preamble sections with a series of repeating preamble symbols.

5. The multicarrier communications apparatus as recited in claim 1, wherein the preamble construction unit is further configured to construct at least one section of the plurality of sequential preamble sections with one or more non-preamble symbols.

6. The multicarrier communications apparatus as recited in claim 1, wherein the multicarrier transmission unit is further configured to transmit the robust preamble with symbols modulated by pseudorandom binary sequence (PRBS) and/or by using special modulation sequence with high autocorrelation properties.

7. A method comprising:
obtaining robust-preamble parameters;
constructing a robust preamble in accordance, at least in part, with preamble parameters, wherein the robust preamble is constructed to include at least two transitions between a plurality of sequential preamble sections of one or more equal symbols, wherein each preamble section is bound by preamble symbols that differ from preamble symbols of a preceding section, wherein a designated number of the equal symbols between adjacent ones of the at least two transitions is larger than four;

obtain a frame that is yet to be transmitted;

transmitting the constructed robust preamble associated with the frame over a wired communications medium subject to non-stationary noise.

8. The method as recited in claim 7, wherein the preamble parameters are selected from a group consisting of a number of the sequential preamble sections and the designated number of symbols for each of the sections.

9. The method as recited in claim 7, wherein the transmitting is performed at least in part by utilizing Orthogonal Frequency-Division Multiplexing (OFDM).

10. The method as recited in claim 7, wherein the constructing includes fabricating at least one section of the plurality of sequential preamble sections with a series of repeating preamble symbols.

11. The method as recited in claim 7, wherein the constructing includes fabricating at least one section of the plurality of sequential preamble sections with one or more non-preamble symbols.

12. The method as recited in claim 7, wherein the transmitting includes sending the robust preamble by modulating symbols by pseudorandom binary sequence (PRBS) and/or by using special modulation sequence with high autocorrelation properties.

13. One or more non-transitory computer-readable media storing processor-executable instructions that, when executed, cause one or more processors to perform operations that facilitate successful reception of a data packet via a wired communications medium subject to non-stationary noise, the operations comprising:

receiving a preamble of a data packet, wherein the preamble is constructed to include multiple transitions between each section of a plurality of sequential preamble sections of one or more equal symbols, wherein each preamble section is bound by preamble symbols that differ from preamble symbols of a preceding section, wherein a designated number of the equal symbols between adjacent ones of the at least two transitions is larger than four;

locating at least one of the multiple transitions between sequential sections;

synchronizing a start of a frame of the data packet of the preamble based, at least in part, upon which of the multiple transitions was located;

receiving, via the wired communications medium, the frame based upon the synchronizing of the start of the frame.

14. One or more non-transitory computer-readable media as recited in claim 13, wherein the synchronizing operation includes performing at least these actions:

identifying preamble symbols;

detecting a change in subsequent preamble symbols;

locating at least one of the multiple transitions between sections based, at least in part, upon the detected change;

determining which of the multiple transitions has been located; and calculating the start of the frame based, at least in part, upon which of the multiple transitions was located.

15. One or more non-transitory computer-readable media as recited in claim 14, wherein the calculating is based at least in part upon the preamble parameters.

16. One or more non-transitory computer-readable media as recited in claim 13, wherein the preamble parameters are selected from a group consisting of a number of the sequential preamble sections and the designated number of symbols for each of the sections.

17. One or more non-transitory computer-readable media as recited in claim 13, wherein receiving is performed at least in part by utilizing Orthogonal Frequency-Division Multiplexing (OFDM).

18. One or more non-transitory computer-readable media as recited in claim 13, wherein the locating includes locating a transition other than the first transition of the multiple transitions.

19. One or more non-transitory computer-readable media as recited in claim 13, wherein the preamble symbols of one section are inverse of the preamble symbols of at least one other section.

20. One or more non-transitory computer-readable media as recited in claim 13, wherein at least one of the multiple transitions are damaged beyond recognition by the non-stationary noise on the communication medium.

21. A multicarrier communications apparatus comprising:

a preamble construction unit configured to construct a preamble of a frame, wherein the preamble is constructed to include at least two transitions between a plurality of sequential preamble sections of one or more equal symbols, wherein a designated number of the equal symbols between adjacent ones of the at least two transitions is larger than four, a multicarrier transmission unit configured to transmit the frame over a wired communications medium subject to non-stationary noise with the preamble associated therewith.

22. The multicarrier communications apparatus as recited in claim 21, wherein the preamble construction unit is further configured to construct the preamble, at least in part, in accordance with at least one preamble parameter, the preamble parameter being selected from a group consisting of a number of the sequential preamble sections and the designated number of symbols for each of the sections.

23. The multicarrier communications apparatus as recited in claim 21, wherein the preamble construction unit is further configured to construct the preamble such that each preamble section is bound by preamble symbols that differ from preamble symbols of its one or more neighboring sequential sections.

24. The multicarrier communications apparatus as recited in claim 21, wherein the multicarrier transmission unit is further configured to transmit by utilizing Orthogonal Frequency-Division Multiplexing (OFDM).

25. The multicarrier communications apparatus as recited in claim 21, wherein the preamble construction unit is further configured to construct at least one section of the plurality of sequential preamble sections with a series of repeating preamble symbols.

26. The multicarrier communications apparatus as recited in claim 21, wherein the preamble construction unit is further configured to construct at least one section of the plurality of sequential preamble sections with one or more non-preamble symbols.

27. The multicarrier communications apparatus as recited in claim 21, wherein the multicarrier transmission unit is further configured to transmit the preamble with symbols modulated by pseudorandom binary sequence (PRBS) and/or by using a modulation sequence with non-zero autocorrelation properties.

* * * * *